(No Model.)
J. W. VOGLESONG.
RUBBER BUCKET FOR PUMPS.
No. 274,061. Patented Mar. 13, 1883.
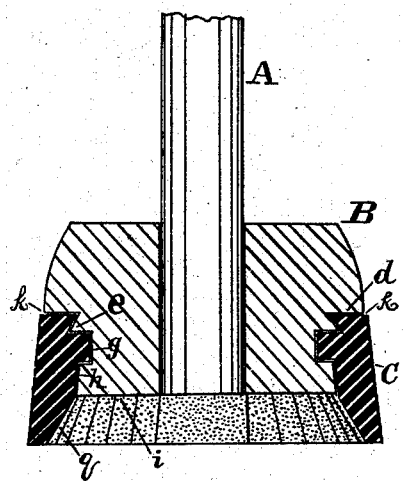
Fig. 1.
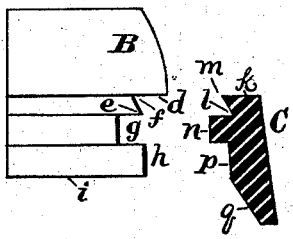
Fig. 3.
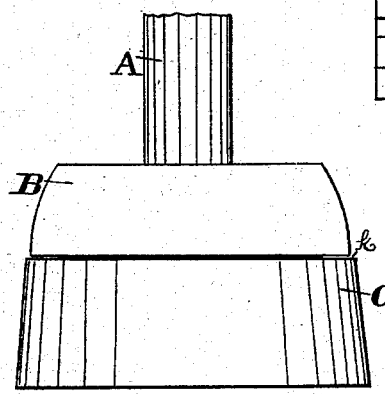
Fig. 2.
Fig. 4.
Witnesses:
A. E. Eader
John E. Morris
Inventor:
John W. Voglesong
By Chas. B. Mann
Attorney

UNITED STATES PATENT OFFICE.

JOHN W. VOGLESONG, OF MINERVA, OHIO.

RUBBER BUCKET FOR PUMPS.

SPECIFICATION forming part of Letters Patent No. 274,061, dated March 13, 1883.

Application filed July 29, 1882. (No model.)

*To all whom it may concern:*

Be it known that I, JOHN W. VOGLESONG, a citizen of the United States of America, residing at Minerva, in the county of Stark and State of Ohio, have invented certain new and useful Improvements in Rubber Buckets for Pumps, of which the following is a specification, reference being had therein to the accompanying drawings.

My invention relates to certain improvements in the construction of rubber buckets or cups for force-pumps, and will first be described, and then designated in the claim.

In the drawings hereto annexed, Figure 1 is a vertical diametrical section of the piston-head and rubber bucket. Fig. 2 is a side view of the same. Fig. 3 is a view in which the piston-head and rubber bucket are shown separated. Fig. 4 shows a force-pump with my device in position.

The letter A designates the rod, to which the piston-head B is attached in any suitable manner, and C the rubber bucket or cup secured to the piston-head. This bucket is designed to be made of vulcanized rubber left in a pliable or flexible condition. Vulcanized rubber is particularly adapted for this use in pumps, because water acts as a lubricator to it.

The piston-head B is a solid circular block. The lower part of the periphery is turned away to leave a broad downward-facing shoulder, d, the surface of which is at right angles to the axis of the block. From this shoulder is turned an acute angular flange, e. The beveled side of the latter forms one side of an annular dovetailed groove, f, of which the downward-facing shoulder d forms the other side. Below the angular flange is a square-cut annular groove, g, and below this is a square-edged flange, h. The letter i designates the face or bottom of the piston-head.

The rubber bucket or cup C has an inner-side construction which is a counterpart of that of the piston-head. The top of the bucket has a flat surface, k, which abuts against the projecting shoulder d of the piston-head, and by which it has a firm seat. An acute angular groove, l, is formed around the inner side. The inner acute edge, m, of the rubber occupies the annular dovetailed groove f of the head, while the acute flange e of the head occupies the acute groove l of the rubber. The rubber has an inward-projecting tongue, n, with three right-angled sides, and the tongue occupies the square-cut annular groove g of the head. An inside straight annular surface, p, below the tongue, rests against the outer face of the flange h of the head. From the surface p extends an outwardly beveled or flaring rim, q. The inner acute edge, m, and the acute angular groove l, in connection with the inwardly-projecting tongue n on the rubber, form, with the counterparts thereof on the head, a dovetail, which secures the rubber to the head very tightly, and renders other fastening unnecessary. By this arrangement the rubber is sure to keep its place on the piston-head. The outer side or periphery of the rubber is flaring—that is, larger at the bottom than at the top, where it joins the head. This causes it to fit the pump-cylinder r, as shown in Fig. 4. This being a force-pump, the rod A is worked by the lever-handle s. t and u are flap-valves, hinged and operated in a manner which will be readily understood by any one skilled in the art of pump-making.

When in use this bucket forms a tight packing, which enables great force to be exerted on the water.

Having described my invention, I claim and desire to secure by Letters Patent of the United States—

In a pump-piston, the combination of a solid head having a broad downward-facing shoulder, d, an acute angular flange, e, with an annular dovetailed groove, f, between it and the said shoulder, an annular groove, g, next to said flange, and a square-edged flange, h, next to the last-mentioned groove, with a rubber bucket having an inner-side construction which is the counterpart of the aforesaid parts on the piston-head, as set forth.

In testimony whereof I affix my signature in presence of two witnesses.

JOHN W. VOGLESONG.

Witnesses:
CHAS. S. CREIGHTON,
I. L. BLACKMORE.